US008014011B2

(12) United States Patent
Kim (10) Patent No.: US 8,014,011 B2
(45) Date of Patent: Sep. 6, 2011

(54) METHOD OF PRINTING WEB PAGE AND APPARATUS THEREFOR

(75) Inventor: Dae-hyun Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1188 days.

(21) Appl. No.: 10/414,205

(22) Filed: Apr. 16, 2003

(65) Prior Publication Data

US 2004/0066531 A1  Apr. 8, 2004

(30) Foreign Application Priority Data

Oct. 7, 2002 (KR) .................. 10-2002-0060964

(51) Int. Cl.
*G06F 3/12* (2006.01)
(52) U.S. Cl. ...... 358/1.15; 358/1.18; 358/403; 358/462; 382/180; 382/282
(58) Field of Classification Search ................ 358/1.15, 358/474, 402, 453, 1.18, 1.12, 403, 462; 715/517, 527, 526; 709/203, 219; 382/306, 382/305, 317, 171, 175, 180, 181, 282; 707/5, 707/709
See application file for complete search history.

(56) References Cited

U.S. PATENT DOCUMENTS

| | | | | |
|---|---|---|---|---|
| 5,532,825 A | * | 7/1996 | Lim et al. ................ | 358/296 |
| 5,692,073 A | * | 11/1997 | Cass ........................ | 382/219 |
| 5,848,413 A | * | 12/1998 | Wolff ...................... | 707/10 |
| 6,035,308 A | * | 3/2000 | Yano et al. ............... | 715/501.1 |
| 6,222,634 B1 | * | 4/2001 | Dubbels et al. .......... | 358/1.15 |
| 6,263,121 B1 | * | 7/2001 | Melen et al. ............. | 382/305 |
| 6,314,432 B1 | | 11/2001 | Potts, Jr. | |
| 6,537,324 B1 | * | 3/2003 | Tabata et al. ............ | 715/513 |
| 6,750,978 B1 | * | 6/2004 | Marggraff et al. ....... | 358/1.12 |
| 6,938,170 B1 | * | 8/2005 | Kraft et al. .............. | 726/23 |
| 7,142,318 B2 | * | 11/2006 | Lopez et al. ............. | 358/1.15 |

(Continued)

FOREIGN PATENT DOCUMENTS

EP  851 367  7/1998

(Continued)

OTHER PUBLICATIONS

Peter Robinson, Dan Sheppard, Richard Watts, Robert Harding & Steve Lay, The Origami Project: Paper Interfaces to the World-Wide Web, 1997, EUROGRAPHICS vol. 16 No. 3, pp. 1-6.*

(Continued)

*Primary Examiner* — Chan S Park
*Assistant Examiner* — Jamares Q Washington
(74) *Attorney, Agent, or Firm* — Staas & Halsey LLP (57) ABSTRACT

An Internet/web page printer printing other web pages linked to a printed web page and a method thereof. A URL hyperlinked to the printed web page is extracted from web page information, which is obtained through a network via a web browser and converted into image information to be printed. From the converted image information, URL region information is obtained indicating a print region in which a URL anchor corresponding to the extracted hyperlinked URL is located on the printed web page. Location information input through a location input unit corresponding to the printed image information is compared with the URL region information to select an extracted hyperlinked URL corresponding to the input location information. The selected extracted hyperlinked URL is provided to the web browser so that corresponding web page information is obtained, thereby obtaining other web pages hyperlinked to the printed web page.

8 Claims, 4 Drawing Sheets

U.S. PATENT DOCUMENTS

| | | | |
|---|---|---|---|
| 2001/0013012 A1* | 8/2001 | Hanaoka et al. | 705/14 |
| 2002/0069260 A1 | 6/2002 | Tagg | |
| 2003/0123079 A1* | 7/2003 | Yamaguchi et al. | 358/1.15 |
| 2003/0229857 A1* | 12/2003 | Sayuda et al. | 715/517 |

FOREIGN PATENT DOCUMENTS

| | | | |
|---|---|---|---|
| EP | 964 339 | | 12/1999 |
| EP | 977 130 | | 2/2000 |
| EP | 1 109 113 | | 6/2001 |
| EP | 1 204 043 | | 5/2002 |
| JP | 11-134126 | | 5/1999 |
| JP | 11134126 A | * | 5/1999 |
| JP | 11-212751 | | 8/1999 |
| JP | 2000-293349 | | 10/2000 |
| WO | 02/41192 | | 5/2002 |

OTHER PUBLICATIONS

European Communication, dated Jun. 14, 2005, in the European Application No. 03 253 737.5 corresponding to the present above-identified pending US patent application (5 pages).

Decision of Technical Board of Appeal 3.5.1, dated Apr. 21, 2004, decision No. T0258/03-3.5.1 Hitachi (9 pages).

English language Machine Translation of Patent Abstracts of Japan, vol. 1999, No. 10, Aug. 31, 1999 & JP 11 134126 A (Canon Inc.), May 21, 1999 (paragraphs 1-131, 17 pages).

* cited by examiner

METHOD OF PRINTING WEB PAGE AND APPARATUS THEREFOR

CROSS-REFERENCE TO RELATED APPLICATIONS

This application claims priority benefit from Korean Patent Application No. 2002-60964, filed Oct. 7, 2002 in the Korean Intellectual Property Office, the contents of which are incorporated herein by reference in their entirety.

BACKGROUND OF THE INVENTION

1. Field of the Invention

The present invention relates to a network printer, and more particularly, to a web page printing method for printing other web page information linked (hyperlinked) to an output web page and an apparatus therefor.

2. Description of the Related Art

With the development of information communications apparatuses, a variety of mobile devices as well as computers, for example, a mobile phone, a PDA, and a network printer, are equipped with web browsers such that a web page on a web server can be accessed and printed from the devices.

In particular, a network printer equipped with a web browser (Internet/web printer) that can directly print a web page without passing through a computer is becoming ubiquitous. The Internet/web printer comprises a web browser and a network card. The Internet/web printer obtains information, such as web page information, from a web server via the installed web browser through a network interface apparatus, such as the network card, converts the obtained web page in a form that can be printed, and prints the web page.

For example, Japanese Patent Application Laying-Open Gazette 11-134126 (laid open on May 21, 1999) discloses a printer that can directly obtain data from a web server on a network without passing through an information processing apparatus, such as a computer, and can print data obtained from a web server. The apparatus of the Japanese Patent Application Laying-Open Gazette 11-134126 can store a bookmark, and enables the printer to set a printing time of web pages corresponding to uniform resource locators (URLs) in the bookmark. The URLs in the bookmark are displayed, retrieved, and selected on an LCD panel. The bookmark uses the worldwide web, and stores predetermined web addresses in the form of a list to easily access the web addresses.

The URL indicates the locations of files in each web server providing services on the web and includes the types of accessible services, the location of the web server (domain name), and a file name. The general syntax of the URL is formed as follows: protocol://the name of a computer containing information/directory name/file name.

Figure 1:
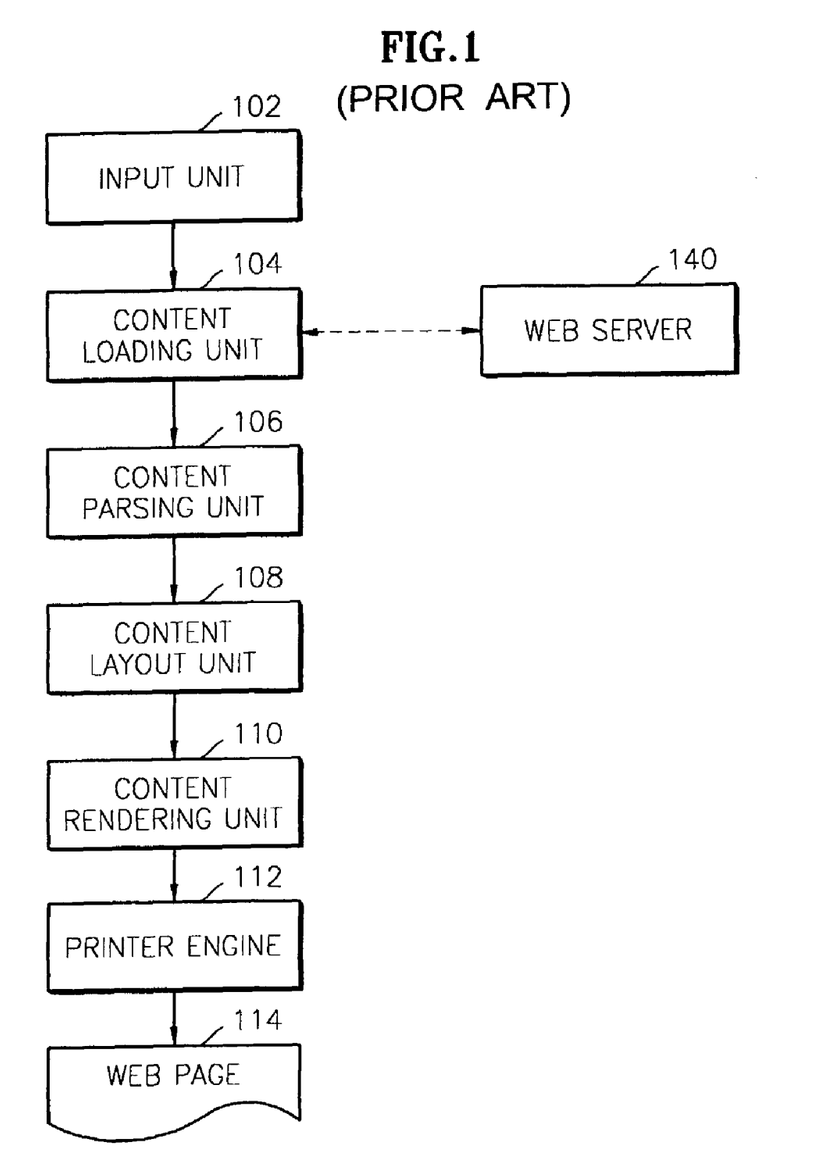
FIG. 1 is a functional block diagram of a conventional Internet/web printer printing web page information.

FIG. 1 is a functional block diagram of a conventional Internet/web printer printing web page information. The apparatus shown in FIG. 1 comprises a URL input unit 102, a content loading unit 104, a content parsing unit 106, a content layout unit 108, a content rendering unit 110, and a printer engine 112.

The URL input unit 102 receives a URL of a web page desired to be printed by a user. The content loading unit 104 accesses a web server 140 through a network card (not shown), obtains web page information corresponding to the URL input through the URL input unit 102, and provides obtained web page information to the content parsing unit 106. The content loading unit 104 corresponds to a web browser installed in a network printer, thereby providing the Internet/web page printer.

The content parsing unit 106 parses content data to be output, from the web page information. The content data to be output is, for example, a text, a figure, an image, etc. The content layout unit 108 lays out information items provided by the content parsing unit 106, that is, the text, figure, image, etc., on locations where, and in a way by which, the items are to be printed on a printing paper, and provides the layout information to the content rendering unit 110.

The content rendering unit 110, which refers to the layout information generated in the content layout unit 108, renders an image to be printed, and converts the image into a print command that can be processed by the printer engine 112. The printer engine 112 prints a printing paper 114 according to the print command provided by the content rendering unit 110. By the print operation of the printer engine 112, the web page information is printed on the printing paper 114.

In the conventional Internet/web printer shown in FIG. 1, the URL of a web page desired to be printed is input through the URL input unit 102, web page information is obtained through the content loading unit 104, and, thus, obtained web page information can be printed in the printing paper 114 through the content parsing unit 106, the content layout unit 108, the content rendering unit 110, and the printer engine 112.

However, in the printed web page, the URL of a predetermined hyperlinked article cannot be found (determined/accessed). This is because when the web page is printed, only a typical indication (for example, underlined hypertext letters) that the predetermined article is hyperlinked to the web page when displayed is printed on paper, but the URL of the article is not revealed on the printed web page or accessible at the Internet/web printer, for example, by being registered as a bookmark and displayed via the URL input unit 102 for print selection. Accordingly, with the prior art Internet/web printer, the contents of a predetermined article hyperlinked to the web page printed cannot be readily checked (accessed via the Internet/web printer) without manually determining the URL of the hyperlink and/or inputting the URL of the hyperlink via the URL input unit 102 to print the hyperlinked web page.

Accordingly, since a conventional Internet/web printer can access only URLs registered in the bookmark or input via an input unit, a user cannot efficiently access a desired hyperlinked web page shown on a printed web page. For example, even if after printing a web page a user wants to print a web page hyperlinked to the printed web page, because the URL of the hyperlinked web page cannot be obtained from the printed web page, the user cannot print the linked web page.

SUMMARY OF THE INVENTION

The present invention provides an improved web page printing method by which other web pages linked to a web page printed by a network printer equipped with a web browser and a network card (i.e., Internet/web printer) can be efficiently printed.

The present invention also provides an apparatus implementing the web page printing method of the present invention.

Additional aspects and advantages of the invention will be set forth in part in the description which follows and, in part, will be obvious from the description, or may be learned by practice of the invention.

According to an aspect of the present invention, there is provided a web page printing method for a network printer which has a web browser and a network interface unit, the network printer obtaining web page information corresponding to an input uniform resource locator (URL) through the web browser and the network interface unit, converting the obtained web page information into image information for printing, and printing the image information, the method comprising extracting a URL hyperlinked to the web page from the obtained web page information obtained through the network; converting the web page information into image information and printing the image information; from the converted image information, obtaining region information indicating a region in which a hypertext URL corresponding to the extracted URL is located; receiving location information input through a location input unit corresponding to the printed image information; comparing the input location information with the region information of the extracted URL, and selecting an extracted URL corresponding to the input location information; and providing the selected extracted URL to the web browser to obtain web page information corresponding to the selected URL.

According to an aspect of the present invention, the location information input comprises placing a paper on which image information is printed, on a location input unit; and receiving the location information input corresponding to a location selected on the printed paper, via the location input unit.

According to an aspect of the present invention, the selecting of a URL comprises displaying URL information corresponding to the input location information through a display device; and receiving an input selecting the displayed URL.

According to another aspect of the present invention, there is provided a network printer, which has a network interface unit accessing the Internet and a web browser obtaining web page information corresponding to an input URL, through the network interface unit, comprising an image information conversion unit which converts web page information obtained through the web browser into image information; a URL extracting unit which extracts a URL linked to a web page from the obtained web page information; a URL region information obtaining unit which obtains region information indicating a region on which a hypertext URL corresponding to the URL extracted by the URL extracting unit is located, from the image information generated by the image information conversion unit; a location information input unit through which location information is input; and a selection unit which compares the location information input through the location information input unit with the URL region information obtained by the URL region information obtaining unit, selects an extracted URL corresponding to the input location information, and provides the selected extracted URL to the web browser.

According to an aspect of the present invention, the location information input unit is a flat panel-type digitizer installed at a paper output tray of the network printer.

BRIEF DESCRIPTION OF THE DRAWINGS

The above and/or other aspects and advantages of the present invention will become more apparent by describing in detail preferred embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Since the general structure of a printer is well-known to those skilled in the art, instead of explaining the entire structure of a printer, the present invention will now be explained focusing on elements obtaining and processing web page information.

Figure 2:
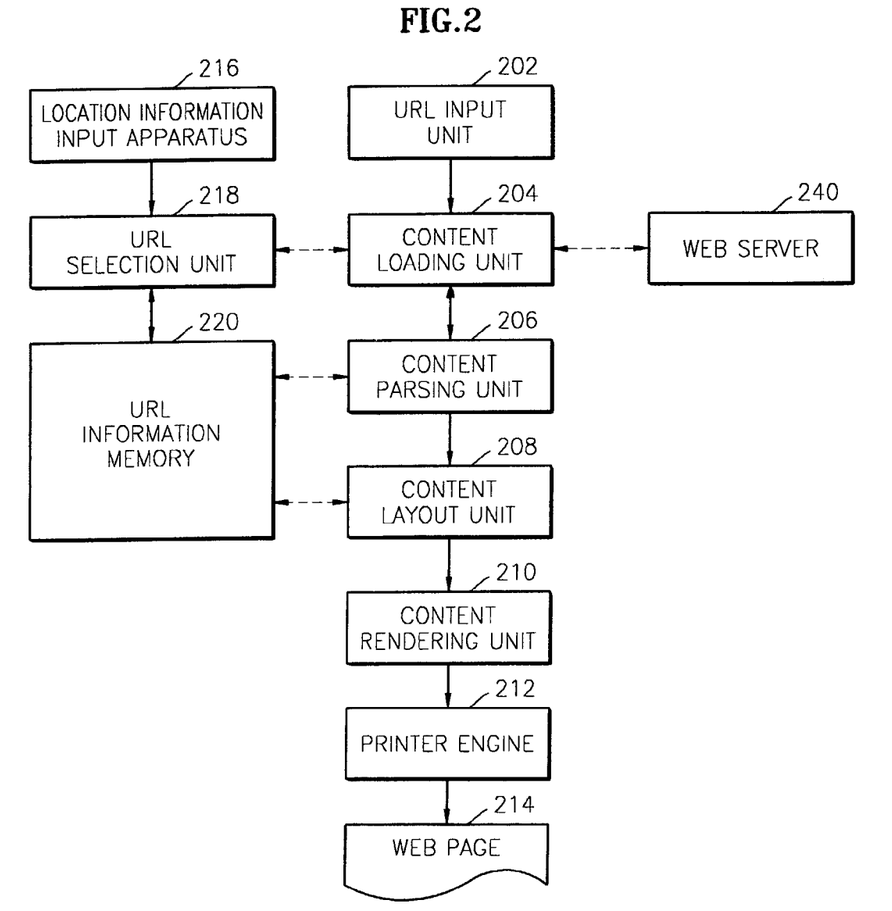
FIG. 2 is a functional block diagram of an apparatus printing a web page in a network printer, according to an embodiment of the present invention.

FIG. 2 is a functional block diagram of an apparatus printing a web page in a network printer, and thereby providing an Internet/web page printer, according to an embodiment of the present invention. The apparatus shown in FIG. 2 comprises a URL input unit 202, a content loading unit 204, a content parsing unit 206, a content layout unit 208, a content rendering unit 210, a printer engine 212, a location information input apparatus 216, a URL selection unit 218, and a URL information memory 220.

The URL input unit 202 receives a URL of a web page desired to be printed by a user. The content loading unit 204 accesses a web server 240 through a network card (not shown), obtains web page information corresponding to the URL input through the URL input unit 202, and provides obtained web page information to the content parsing unit 206. The content loading unit 204 corresponds to a web browser installed in a network printer.

The content parsing unit 206 parses content data to be output, from the obtained web page information. The content data to be output is, for example, a text, a figure, an image, etc. If there are URL information items in the obtained web page information (i.e., linked web pages in the obtained web page information), that is, for example, hypertext letters corresponding to a URL (i.e., a hypertext URL) or a graphically expressed URL (collectively referred to as a URL anchor) and a URL, typically such linked URL information is provided to the content layout unit 208, the content loading unit 204, and the URL memory 220. The content loading unit 204 obtains web page information corresponding to the linked URLs provided by the content parsing unit 206, and stores the linked web page information, thereby storing in advance hyperlinked web page information.

The content layout unit 208 lays out information items provided by the content parsing unit 206, that is, the text, figure, image, etc., on locations where, and in a way by which, the items are to be printed out on a printing paper, and provides the layout information to the content rendering unit 210. For example, the content layout unit 208 can lay out locations for letters on a printing paper, referring to markup language tags for setting a paragraph, including <P> (Paragraph), <BR> (BReak), <PRE> (PREformatted text), <HR> (Horizontal Ruler), <LIST>, and <BLOCKQUOTE>. Also, the content layout unit 208 can lay out the size of letters to be printed, referring to tags for setting the size of letters, including <Hn> (Heading), <BASEFONE SIZE=n>, and <FONT>. In addition, the content layout unit 208 can lay out the location on a printing paper and size of an image, referring to a tag <IMG SRC=" ... ">.

Meanwhile, using as an example hypertext URL letters as a URL anchor, the content parsing unit 206 obtains the URL information referring to a markup language tag, <AHREF=" , , , "> ... >. Here, in the part " , , , ", the address of a site desired to be accessed or the URL of a document is written, and in the part " ... ", hypertext letters corresponding to the URL (i.e., a hypertext URL) are written. Typically, when an HTML document is viewed or printed through a web browser and the content layout unit 208, only the URL anchor, such as the hypertext URL letters with an underline drawn under the hypertext letters is displayed/printed (revealed). Also, in case of hypertext URL letters to further distinguish the hypertext URL letters from other ordinary letters, the hypertext URL letters are displayed/printed in a different color.

Meanwhile, referring to the URL information provided by the content parsing unit 206, the content layout unit 208 provides coordinates (hereinafter referred to as "URL region information" or "URL anchor print region information") allocating a region where the hypertext URL letters are to be printed, to the URL information memory 220. Since the content layout unit 208 allocates a location where the hypertext URL letters (usually, referred to as a URL anchor) corresponding to a URL are laid out when displayed, the coordinates of a region where the hypertext URL letters are to be printed can be provided to the URL information memory 220. Here, the URL region information may simply be the coordinates of vertices of a rectangular box, and may also be coordinates representing more complicated figures so as to correspond to graphically expressed hypertext URL letters.

Therefore, the URL information memory 220 stores the URL information from the content parsing unit 206 and the URL region information indicating the region in which the hypertext URL letters corresponding to the linked URLs are printed on a printing paper, from the content layout unit 208.

The content rendering unit 210 referring to the layout information generated in the content layout unit 208, converts the parsed information items into image information and into a print command that can be processed by the printer engine 212. The printer engine 212 prints a printing paper 214 according to the print command provided by the content rendering unit 210. By the print operation of the printer engine 212, the obtained web page information is printed on the printing paper 214.

The print paper 214 on which the obtained web page information is printed, is put (placed) on a location information input apparatus 216. Here, the location information input apparatus 216 is mapped to correspond to the printing paper 214. That is, if the user selects a location on the printing paper 214 put on the location information input apparatus 216, location information indicating the selected location is output from the location information input apparatus 216. The location information output from the location information input apparatus 216 is provided to the URL selection unit 218.

According to an aspect of the present invention, the location information input apparatus 216 is a flat panel-type digitizer on which a printing paper can be placed correctly. A digitizer is an apparatus outputting location information corresponding to an indicated location, for example, coordinate information, and the types of digitizers include a finger touch type, a stylus type, a touch panel type, etc. According to an aspect of the present invention, typically the location information input apparatus 216 is the finger touch type and when a web page is printed on a paper, the user touches a hyperlinked URL anchor printed on the paper to select the printed hyperlinked URL on the paper by selecting (causing generation of) location information, via the location information input apparatus 216, corresponding to the printed URL anchor. In particular, the selected/generated location information by the apparatus 216 is compared to the pre-stored URL anchor print region information to determine which printed hyperlinked URL anchor the user has selected on the printed web page paper.

Figure 3:
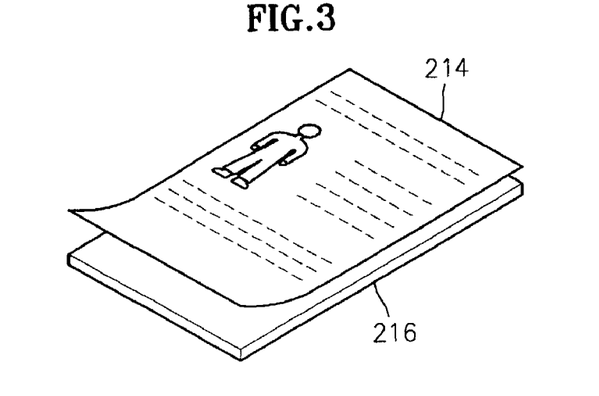
FIG. 3 is a schematic diagram of a method of inputting location information on a printing paper to be placed on a location information input apparatus, according to an embodiment of the present invention.

FIG. 3 is a schematic diagram of a method of inputting location information on the printing paper 214 placed on the location information input apparatus 216, according to an embodiment of the present invention. On the printing paper 214, web page information, including, hyperlinked web pages, for example, hypertext URL letters is printed, and the hypertext URL letters are usually marked with an underline. If the user selects one of the hypertext URLs on the printing paper 214, the location information input apparatus 216 recognizes the selection and outputs location information. According to an aspect of the present invention, the location information input apparatus 216 is installed in a place where a printing paper is output from the Internet/web page printer so that the user does not need to additionally set printing papers.

Figure 4:
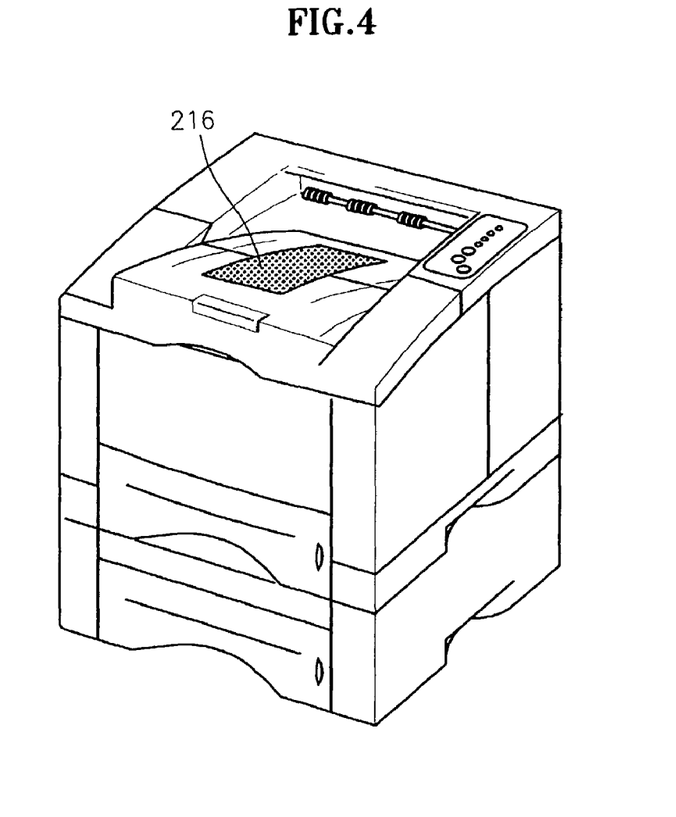
FIG. 4 is a diagram of a location recognition apparatus installed at a paper output tray of an Internet/web page printer, according to an embodiment of the present invention.

FIG. 4 is a diagram of a location recognition apparatus installed at a paper output tray of an Internet/web page printer, according to an embodiment of the present invention. Though the location information input apparatus 216 may be installed on or close to a control panel controlling the operations of the Internet/web page printer, to pursue easy use and easy printer design, typically the location information input apparatus 216 is installed at the paper output tray.

With reference to FIG. 2, the URL selection unit 218 compares location information of a user-selected location on the print paper 214 (for example, a user-selected printed hypertext URL) provided by the location information input apparatus 216 with the URL region information stored in the URL information memory 220, and selects an extracted linked URL corresponding to a matching URL region information. The selected extracted linked URL is provided to the content loading unit 204. Since, typically, the content loading unit 204 accesses and stores in advance other web pages linked to the printed web page, as described above, the content loading unit 204 can immediately provide web page information corresponding to the selected extracted linked URL (i.e., linked web page information) provided by the URL selection unit 218. Although the content loading unit 204 does not necessarily need to obtain and store in advance other web page information linked to the printed web page, the time for printing the other linked web page information is much shortened.

Figure 5:
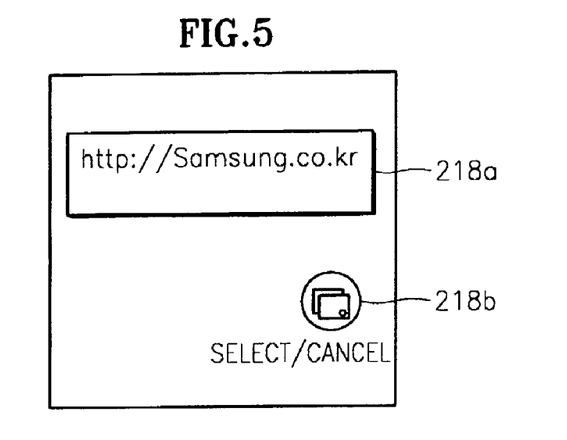
FIG. 5 is a diagram showing an appearance of a URL selection unit, according to an embodiment of the present invention.

FIG. 5 is a diagram showing an appearance of the URL selection unit 218, according to an embodiment of the present invention. The URL selection unit 218 comprises a display unit 218a and a selection button 218b. If the user selects a location on a printing paper 214 placed on the location information input apparatus 216, for example, if the user pushes a location with a finger or a pointing device, location information corresponding to the pushed location is generated from the location information input apparatus 216. This location information is provided to the URL selection unit 218, and the URL selection unit 218 accesses the URL information memory 220 and searches for URL region information corresponding to the input location information from the location information input apparatus 216.

If there is URL region information corresponding to the input location information, the URL information corresponding to the URL region information, for example, the URL (shown in FIG. 5) or hypertext URL letters (e.g., "Samsung" as underlined with colored font, not shown in FIG. 5), are displayed on the display unit 218*a*. The user confirms the selected location as correct, referring to the displayed hypertext URL letters, and then pushes the selection button 218*b*. By pushing the selection button 218*b*, the URL corresponding to the selected hypertext URL letters is provided to the content loading unit 204, which can, for example, immediately provide the web page information corresponding to the selected linked URL to the content parsing unit 206 for processing.

Figure 6:
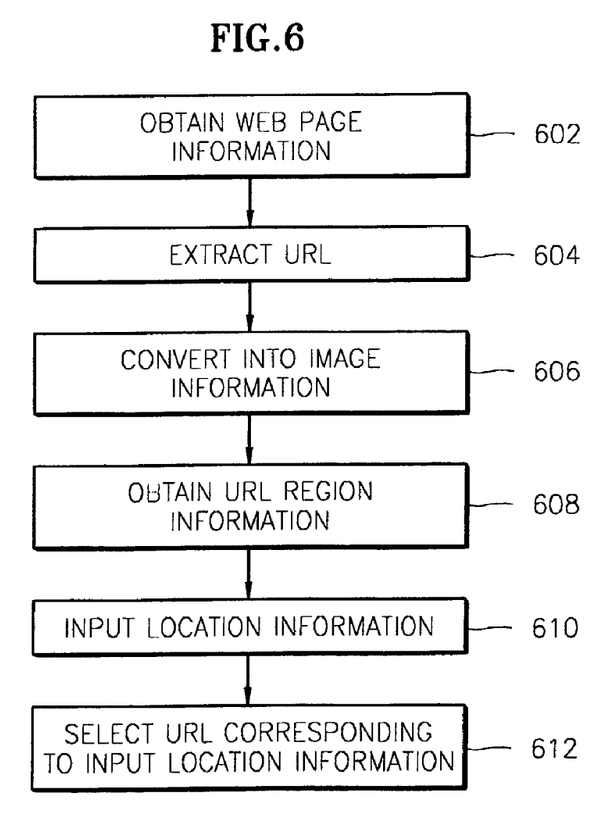
FIG. 6 is a flowchart of printing web page information using the network printer shown in FIG. 2.

FIG. 6 is a flowchart of printing web page information using the network printer configuration shown in FIG. 2. First, at operation 602, web page information corresponding to a URL input by a user is obtained. In particular, at operation 602, the content loading unit 204 accesses the web server 240, obtains web page information corresponding to the URL input from the URL input unit 202, and provides the obtained web page information to the content parsing unit 206.

At operation 604, other linked URL information is extracted from the web page information obtained through the network. In particular, at operation 604, the content parsing unit 206 parses content data to be output from the obtained web page information, and provides parsed and extracted linked URL information (i.e., a URL and/or a hypertext URL), if any, to the URL memory 220.

At operation 606, the web page information is converted into image information that can be printed and the image is printed. In particular, at operation 606, the content layout unit 208 lays out information items provided by the content parsing unit 206, that is, the text, figure, image, etc., on locations where, and in a way by which, the items are to be printed on a printing paper 214, and provides the layout information to the content rendering unit 210. Referring to the layout information generated by the content layout unit 208, the content rendering unit 210 converts the parsed information items from the content parsing unit 206 into image information and into a print command that can be processed by the printer engine 212. Meanwhile, the printer engine 212 prints the printing paper 214 according to the print command provided by the content rendering unit 210. By the print operation of the printer engine 212, the obtained web page information is printed on the printing paper 214.

At operation 608, from the converted image information, region information is obtained for a region where the extracted linked URL information is to be placed on the print paper 214 (i.e., a URL anchor print region is obtained). In particular, at operation 608, referring to the extracted linked URL information provided by the content parsing unit 206, the content layout unit 208 provides the region information corresponding to the extracted linked URL information (i.e., URL anchor print region information) to the URL information memory 220.

At operation 610, through a location input unit, location information corresponding to the printed image information is input. In particular, if, for example, at operation 610, the user selects one of the linked hypertext URLs printed on the printing paper 214, the location information input apparatus 216 recognizes the user-selected location on the print paper 214 (i.e., recognizes a user-selected printed hypertext URL) and outputs URL location information.

Comparing the input URL location information with the stored URL region information, at operation 612, a URL corresponding to the input URL location information is selected. In particular, at operation 612, the URL selection unit 218 compares the URL location information provided by the location information input apparatus 216 with the URL region information of the extracted linked URL information stored in the URL information memory 220, and selects an extracted linked URL corresponding to a matching URL region information. The selected extracted linked URL is provided to the content loading unit 204. The selected extracted linked URL is provided to the web browser (i.e., the content loading unit 204) so that web page information corresponding to the selected extracted linked URL can be obtained.

According to the present invention, the content loading unit 204 and the content parsing unit 206 obtain web page information corresponding to a URL input by the URL input unit 202 as well as other linked (hyperlinked) URLs in each obtained web page information. Thus, obtained web page information, including hyperlinked web page information, is printed on the printing paper 214 through the content parsing unit 206, the content layout unit 208, the content rendering unit 210, and the printer engine 212. According to the Internet/web page printer of the present invention described above, other web pages hyperlinked to a web page can be easily printed.

More particularly, the present invention provides an Internet/web page printer printing hyperlinked web page information of a printed web page according to input location information of printed URL anchors, or according to input URL anchor print regions (locations). URL information hyperlinked to the printed web page is extracted from web page information, which is obtained through a network, such as the Internet, via a web browser and converted into image information to be printed. From the converted image information, a URL anchor print region location, such as hypertext URL print region information, is obtained/stored indicating a region in which a URL anchor corresponding to the extracted URL information is located on the printed web page/image. Input location information from a location input unit corresponding to the printed web page/image information is compared with the stored URL anchor print region location to select the extracted hyperlinked URL (i.e., to select one of the printed URL anchors) if the input location information matches the URL anchor print region location. The selected extracted hyperlinked URL is provided to the web browser so that web page information corresponding to the selected extracted hyperlinked URL is obtained, thereby obtaining other web pages hyperlinked to the printed web page.

Advantageously, the present invention provides a method of (and an Internet/web page printer) printing web page information of a printed uniform resource locator (URL) anchor selected on a printed web page. Further, although in the described example embodiments web pages hyperlinked to one printed web page are accessible at the printer (e.g., viewed at the printer via the URL selection unit 218, printed, etc.), the present invention is not limited to such configuration, and web pages hyperlinked to all respective (successive) printed web pages can be accessible at the printer, thereby providing nested hyperlinked web page access at the printer. The processes of the invention as shown in FIG. 2 and provided in an Internet/web page network printer are implemented in software and/or computing hardware. For example, the content parsing unit 206 and content layout unit 208 may be software that embody the present invention's URL extractor, and image information converter and URL region information obtainer, respectively. Accordingly, the printer of the invention comprises data storage, such as magnetic and optical discs, RAM, ROM, etc. on which the processes of the invention can be stored and executed.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of printing a web page using a network printer which has a web browser and a network interface unit, and obtains web page information corresponding to an input uniform resource locator (URL) through the web browser and the network interface unit, converts the obtained web page information into image information for printing, and prints the image information, the method comprising:
    extracting a URL hyperlinked to the web page from the web page information obtained through the network interface unit;
    converting the web page information into image information by parsing the web page information using a content parsing unit, providing the parsed web page information to a content layout unit, which lays out locations where the converted image data is to be printed, and printing the image information as the printed web page;
    retrieving from the converted image information URL anchor print region information indicating a region in which a URL anchor corresponding to the extracted hyperlinked URL is located on the printed image information;
    inputting location information corresponding to the printed image information via a location input unit,
    wherein the location information is input by a user using the location input unit,
    wherein the location information input unit is a flat panel-type digitizer receiving thereon the printed web page and the location information is input via the flat panel-type digitizer, which is sensitive to touch, by selecting a location on the printed web page, and
    wherein the selection of the location on the printed web page is made by the user by touching printed web page on the flat panel-type digitizer using a finger or stylus;
    comparing the input location information with the URL anchor print region information to select the extracted hyperlinked URL if the input location information matches the URL anchor print region information; and
    providing the selected extracted hyperlinked URL to the web browser to retrieve corresponding web page information,
    wherein when more than one web page is printed, each printed web page is hyperlinked to all respective printed web pages and each web page is accessible at the network printer, thereby providing nested hyperlinked web page access at the network printer.

2. The method of claim 1, wherein the selection of the extracted hyperlinked URL comprises:
    displaying URL information of the extracted hyperlinked URL if the URL anchor print region matches the input location information, through a display device; and
    receiving an input selecting the displayed URL, wherein the selection is input by the user.

3. A network printer which has a network interface unit accessing the Internet and a web browser obtaining, through the network interface unit, web page information corresponding to an input uniform resource locator (URL), the network printer comprising:
    a URL extractor to extract a URL hyperlinked to the printed web page from the obtained web page information;
    an image information converter to convert web page information obtained through the web browser into image information by parsing the web page information using a content parsing unit, providing the parsed web page information to a content layout unit, which lays out locations where the converted image data is to be printed;
    a print engine to print the image information as a printed web page;
    a URL region information obtaining unit to retrieve, from the image information, URL anchor print region information indicating a region on which a URL anchor corresponding to the extracted hyperlinked URL is located on the printed image information;
    a location information input unit through which location information is input,
    wherein the location information is input by a user using the location information input unit,
    wherein the location information input unit is a flat panel-type digitizer receiving thereon the printed web page and the location information is input via the flat panel-type digitizer, which is sensitive to touch, by selecting a location on the printed web page, and
    wherein the selection of the location on the printed web page is made by the user by touching printed web page on the flat panel-type digitizer using a finger or stylus; and
    a selector to compare location information input through the location information input unit with the URL anchor print region information, to select the extracted hyperlinked URL if the input location information matches the URL anchor print region information, and to retrieve hyperlinked web page information corresponding to the selected extracted hyperlinked URL via the web browser,
    wherein when more than one web page is printed, each printed web page is hyperlinked to all respective printed web pages and each web page is accessible at the network printer, thereby providing nested hyperlinked web page access at the network printer.

4. The network printer of claim 3, wherein the location information input unit is installed at a paper output tray.

5. The network printer of claim 3, wherein location information input unit comprises:
    a display device to display URL information of the extracted hyperlinked URL if the URL anchor print region matches the input location information; and
    an input unit receiving an input selecting the displayed URL.

6. The method of claim 1, wherein the location input unit is installed at a paper output tray.

7. The network printer of claim 3, wherein the URL extractor stores, in a storage, in advance hyperlinked web page information corresponding to the extracted hyperlinked URL and the selector retrieves the hyperlinked web page information corresponding to the selected extracted hyperlinked URL from the storage.

8. A non-transitory computer readable medium storing a computer program to control a printer and comprising a process of:
    retrieving web page information corresponding to an input uniform resource locator (URL) through a network;

extracting a URL hyperlinked to the retrieved web page information;

converting the retrieved web page information into image information by parsing the web page information using a content parsing unit, providing the parsed web page information to a content layout unit, which lays out locations where the converted image data is to be printed and printing the image information as a printed web page;

retrieving from the converted image information URL anchor print region information indicating a location in which a URL anchor corresponding to the extracted hyperlinked URL is printed on the printed image information;

receiving input location information corresponding to the printed URL anchor on the printed image information via a location input unit, wherein the location information is input by a user using the location input unit, wherein the location information input unit is a flat panel-type digitizer receiving thereon the printed web page and the location information is input via the flat panel-type digitizer, which is sensitive to touch, by selecting a location on the printed web page, and wherein the selection of the location on the printed web page is made by the user by touching printed web page on the flat panel-type digitizer using a finger or stylus;

comparing the input location information with the URL anchor print region information to select the extracted hyperlinked URL if the input location information matches the URL anchor print region information; and printing web page information corresponding to the selected extracted hyperlinked URL, wherein when more than one web page is printed, each printed web page is hyperlinked to all respective printed web pages and each web page is accessible at the printer, thereby providing nested hyperlinked web page access at the printer.

* * * * *